United States Patent [19]
Every

[11] 3,936,095
[45] Feb. 3, 1976

[54] FAIL SAFE INDICATOR FOR SKID CONTROL SYSTEM

[75] Inventor: Peter Every, Livonia, Mich.

[73] Assignee: Kelsey-Hayes Company, Romulus, Mich.

[22] Filed: Aug. 24, 1973

[21] Appl. No.: 391,488

[52] U.S. Cl............... 303/21 AF; 303/10; 303/21 F
[51] Int. Cl.² .......................................... B60T 8/06
[58] Field of Search .......... 303/21 F, 21 AF, 61–63, 303/68–69, 10; 188/181 A

[56] References Cited
UNITED STATES PATENTS

| 3,515,440 | 6/1970 | Every et al. ........................ 303/21 F |
| 3,567,290 | 2/1971 | Liggett et al. ...................... 303/21 F |
| 3,602,554 | 8/1971 | Ichimura et al. ................... 303/21 F |
| 3,672,731 | 6/1972 | Koivunen .......................... 303/21 F |
| 3,747,990 | 7/1973 | Tanguy ............................. 303/21 F |
| 3,810,680 | 5/1974 | Schenk ............................. 303/21 F |
| 3,813,130 | 5/1974 | Inada .......................... 303/21 AF X |

Primary Examiner—George E. A. Halvosa
Assistant Examiner—Douglas C. Butler
Attorney, Agent, or Firm—Harness, Dickey & Pierce

[57] ABSTRACT

A vehicular skid control system for relieving the brake pressure when an incipient skid condition is sensed. The system includes a combined check and bleed valve that controls the flow of hydraulic actuating fluid from a master cylinder to the wheel brakes. An expansion chamber is positioned in the fluid circuit between the check and bleed valve and the wheel brakes. An ancillary source of fluid pressure, such as a power steering pump, normally holds the expansion chamber at a minimum volume condition and holds the check and bleed valve open for normal brake operation. When an incipient skid condition is sensed, the expansion chamber is permitted to increase in volume and the combination check and bleed valve is closed. Closure of the check and bleed valve isolates the master cylinder from the wheel brakes and prevents the application of further pressure to the wheel brakes. Expansion of the expansion chamber relieves the existing pressure in the wheel brakes to prevent skidding. A regulator is provided in the circuit connecting the source of ancillary fluid with the expansion chamber for maintaining at least a predetermined pressure in the circuit. The pressure maintained by the regulator is dependent upon the pressure in the brake circuit. A fail safe device is provided that provides an actuating circuit from the master cylinder to the wheel brake in the event of failure of the ancillary pressure source to provide sufficient pressure to hold the check and bleed valve in the normal braking position. An indicator is provided that is responsive to the pressures at the master cylinder and wheel cylinder for indicating if a failure has occurred in the system. Certain of the elements are spring biased in opposition to the bias exerted by the source of ancillary fluid pressure so that these elements may be automatically cycled each time the vehicle engine is started and stopped.

7 Claims, 1 Drawing Figure

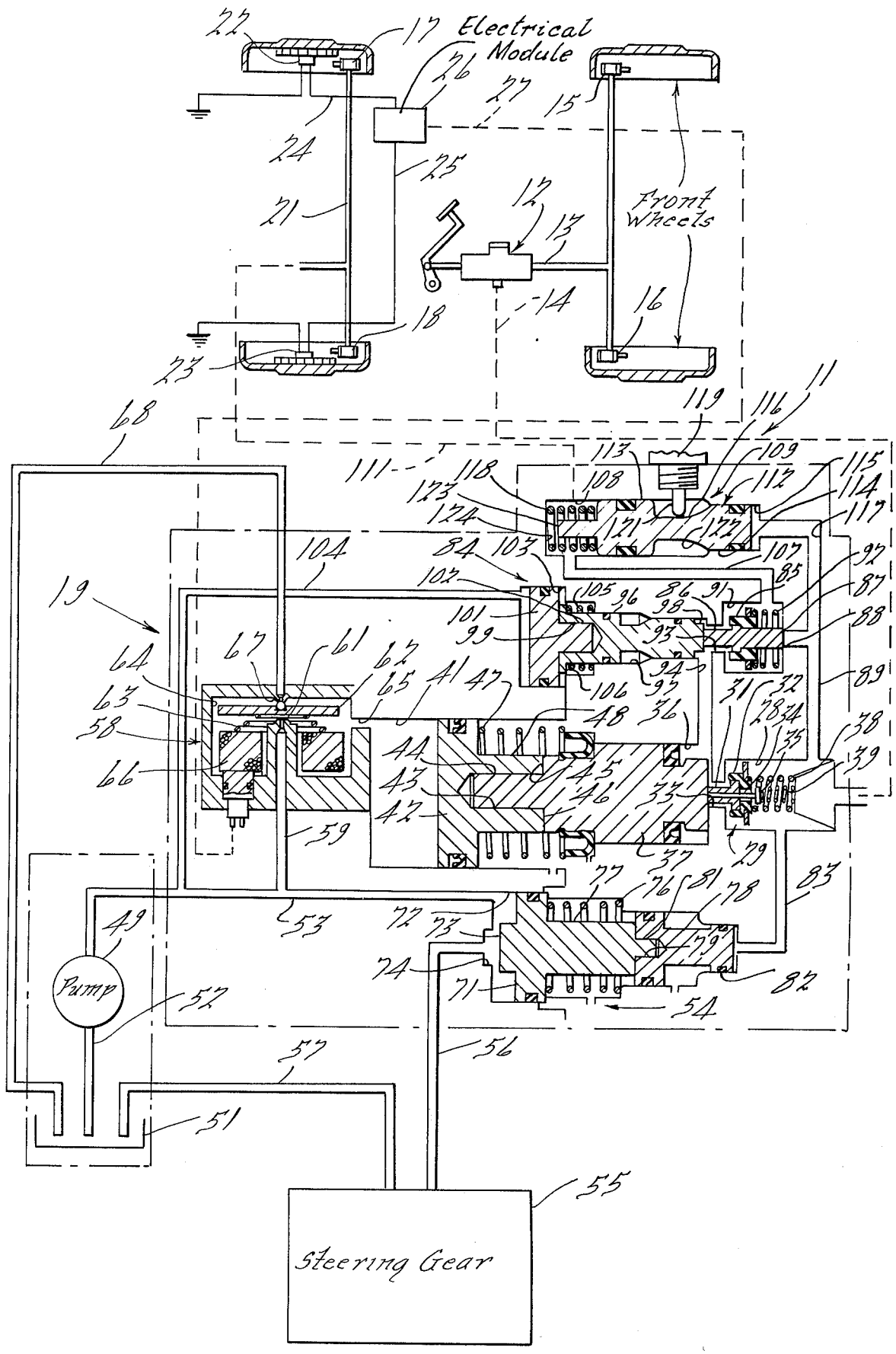

FAIL SAFE INDICATOR FOR SKID CONTROL SYSTEM

BACKGROUND OF THE INVENTION

This invention relates to vehicular skid control systems and more particularly to an improved indicator device for indicating certain functional failures in such a system.

Skid control systems generally provide a mechanism for automatically relieving the brake pressure during an incipient skid condition to prevent skidding and loss of vehicular control. These systems are, for the most part, fully automatic and require no pumping of the brakes by the vehicle operator.' In fact, most commercial systems anticipate that the vehicle operator will maintain brake pressure during the incipient skid condition. Since the device is fully automatic the operator may not even sense its operation. Thus, it may be difficult for the vehicle operator to tell when the skid control system is inoperative. In the absence of some indication of this malfunction, control of the vehicle may be lost during braking.

It is, therefore, a principal object of this invention to provide a skid control system incorporating an indicating device for indicating malfunctioning of the skid control system.

It is another object of the invention to provide an improved and simplified fail safe indicator for a vehicular skid control system.

In certain types of skid control systems a bypass arrangement may be provided for bypassing the modulator in the event of a failure condition. It has been proposed to provide an indication of failure when the bypass system goes into its failure mode. However, such a system is not completely indicative of a failure in the overall brake circuit. For example, even though the system goes into a failure mode the master cylinder may still provide sufficient actuating pressure for the brakes.

It is, therefore, a further object of this invention to provide a skid control system embodying a failure indicator that provides an indication to the vehicle operator when the master cylinder is actuated and actuating pressure is not transmitted to the wheel cylinders.

SUMMARY OF THE INVENTION

This invention is adapted to be embodied in a vehicular skid control system that includes an operator controlled source of actuating fluid, a brake actuating circuit for delivering fluid pressure from said source to at least one wheel brake for selectively actuating the brake and modulator means interposed in the actuating circuit for altering the fluid pressure transmitted from the source to the one wheel brake in response to a predetermined signal. Means are provided that are responsive to the pressure differential in the actuating circuit on opposite sides of the modulator means for providing a signal when the pressure differential exceeds a predetermined value thus providing a failure indication.

BRIEF DESCRIPTION OF THE DRAWING

The FIGURE of the drawing illustrates, in part schematically, a skid control system embodying this invention.

DETAILED DESCRIPTION OF THE PREFERRED EMBODIMENT

A vehicle braking system including a skid control system incorporating this invention is identified generally by the reference numeral 11. The braking system includes a master cylinder, of the dual type, 12 having independent output circuits 13 and 14. The circuit 13 serves the brake cylinders 15 and 16 of the front wheel brakes, which may be of the disk or drum type. The circuit 14 serves the wheel cylinders 17 and 18 of the rear wheel brakes via a skid control modulator, indicated generally by the reference numeral 19, and conduit 21. The rear wheel brakes also may be of either the drum or disk type. In the illustrated embodiment, the skid control modulator 19 acts only on the brake circuit serving the rear wheels and controls both of the wheel cylinders 17 and 18 simultaneously. It is to be understood that it is within the purview of the invention to provide a similar skid control modulator for the front wheel brakes or to provide independent control for each wheel cylinder 15, 16, 17 and 18. Such modifications are deemed to be within the scope of those skilled in the art and for that reason will not be described.

Wheel speed sensors 22 and 23 are associated with each of the rear wheels and provide electric signals via conduits 24 and 25 to an electrical module 26. In the event of an incipient skid condition, which may be sensed in any of a variety of known manners, the module 26 provides a signal to the modulator 19 via a conductor indicated schematically at 27.

Referring now specifically to the modulator 19, the master cylinder conduit 14 delivers fluid to a chamber 28 in which a combined check and bleed valve, indicated generally by the reference numeral 29, is positioned. The check and bleed valve 29 is of the construction described in U.S. Pat. No. 3,486,800, entitled "Skid Control System Including Hydraulic Modulating Valve", issued Dec. 30, 1969 in the name of David T. Ayers, Jr. Reference may be had to that patent for a description of the complete structure and operation of the valve 29. Basically, the valve 29 includes a first plunger 31 that directly actuates a valve 32 for controlling the flow from the chamber 28 into a conduit 33. A second plunger 34 is slidably supported by the first plunger 31 and has a head 35 that is movable into engagement with the first plunger 31 for controlling the flow through a restricted path from the chamber 28 into the conduit 33. The plunger 34 is longer than the plunger 31 so that on reapplication of the brakes, as will become more apparent, initial flow from the master cylinder 12 to the wheel cylinders 17 and 18 will take place through this restricted path.

At the mouth of the conduit 33 an enlarged diameter chamber 36 is provided. The chamber 36 has slidably supported within it an expansion chamber plunger 37. In the normal braking position, as shown in the FIGURE, the plunger 37 is held at a minimum volume condition and engages the plungers 31 and 34 to hold the combination check and bleed valve in a fully open condition against the bias of valve springs 38 and 39.

At the base of the chamber 36 a further, larger diameter chamber 41 is provided. Within the chamber 41 is slidably supported a power piston 42. Power piston 42 is formed with a concentric bore 43. Slidable within the bore 43 is a cylindrical extension 44 of the expansion chamber plunger 37. Facing shoulders 45 and 46 of the expansion chamber plunger 37 and power piston 42 are normally held in abutment. A coil compression spring 47 encirles an extension 48 of the power piston 42 and normally urges the piston 42 toward the left as viewed in the FIGURE.

A source of ancillary fluid pressure is provided for maintaining the power piston 42, expansion chamber plunger 37 and check and bleed valve 29 in the normal braking position, as shown in the FIGURE, in opposition to the action of the springs 47, 38 and 39. The term ancillary fluid refers herein to a fluid pressure source other than the brake pressure. In the illustrated embodiment, this ancillary fluid pressure source is provided by an engine driven pump 49 which may be the vehicle power steering pump. The pump 49 draws fluid from a sump 51 through a conduit 52 and discharges it under pressure into a conduit 53. The pressure in the conduit 53 is controlled by a regulator, indicated generally by the reference numeral 54, in a manner which will become more apparent as this description proceeds.

The conduit 53 serves the power steering gear of the vehicle, indicated schematically at 55, via the regulator 54 and a conduit 56. A conduit 57 returns the fluid from the power steering gear 55 to the sump 51.

A valve, indicated generally by the reference numeral 58 controls the flow of the ancillary fluid from the conduit 53 to the power piston chamber 41. The valve 58 is fed via a conduit 59 which terminates at a valve seat 61. Juxtaposed to the valve seat 61 is a valve plate 62 that is normally biased by a spring 63 to an opened position. In this position, the power steering fluid may flow from the conduit 59 into a valve chamber 64. The valve chamber is ported, as at 65, to the chamber 41.

A solenoid winding 66 is positioned in the valve housing and, when actuated, draws the valve plate 62 downwardly into a closed relationship with the valve seat 61. Simultaneously, a valve seat 67 that is directly opposite to the valve seat 61 is opened. The power steering fluid may then be displaced, in a manner to be described, from the chamber 41, port 65 and chamber 64 back to the sump 51 via a return conduit 68.

The regulator 54 includes a plunger 71 having a portion that is slidably supported in a bore 72. The plunger 71 has a projection 73 that cooperates with a counterbore 74 that terminates in the conduit 56 so as to regulate the pressure drop and, accordingly, the pressure in the conduit 53.

A coil spring 76 encircles an extension 77 of the plunger 71 to provide a preselected bias on the plunger 71. In addition, a second plunger 78 has a bore 79 that receives a projection 81 of the plunger portion 77. The second plunger 78 is supported in a bore 82 that experiences the pressure in the braking circuit and particularly that in the conduit 14 through a conduit 83. As the brake pressure from the master cylinder to the rear wheel brakes is increased, the plunger 78 will bias the plunger 71 to a direction that increases the pressure in the conduit 53.

As is common with many forms of skid control systems, actuation of the skid control modulator 19 causes the check and bleed valve 29 to close and isolate the rear wheel brake cylinders 17 and 18 from the master cylinder supply conduit 14. At the same time, the expansion chamber plunger 37 is permitted to regress against the bias of the power piston 42 to relieve the pressure in the rear wheel brake cylinders 17 and 18.

The source of ancillary fluid, the power steering pump 49, is utilized to hold the check and bleed valve 29 open and to hold the expansion chamber plunger 37 in its minimum volume condition. In the event of failure of the power steering pump 49 or bursting of any of the conduits 53, 59 or 56, a fail safe device, indicated generally by the reference numeral 84, is provided with delivering the brake fluid directly from the master cylinder conduit 14 to the rear wheel brake cylinders 17 and 18 independently of the chamber 36. This will prevent the loss of actuating fluid and will permit normal brake operation albeit without the skid control function.

The fail safe device 84 includes an isolation valve 85 that is carried by a plunger 86. The plunger 86 has a bypass valve end portion 87 that controls the flow through a port 88 formed at the end of a conduit 89. The conduit 89 extends from the chamber 28 to a chamber 91 in which the isolation valve 85 is located. A coil spring 92 encircles the plunger 86 and normally biases the isolation valve 85 toward a closed position, with a port which will be described, and the bypass valve portion 87 to an open position.

The plunger 86 extends through a transverse passage 93 that interconnects the chamber 91 with a conduit 94 that extends to the expansion chamber 36. The isolation valve 85 normally controls the flow through the conduit 94 and passage 93. When this passage is open, brake fluid can flow from the master cylinder past the check and bleed valve 29 through the expansion chamber 36 and on to the chamber 91 via conduit 94 and passage 93. The brake fluid is then delivered to the conduit 21 in a manner to be described.

The isolation valve 85 is normally held in its opened position by means including a plunger 96 that is slidably supported in a stepped bore 97 and which has an end portion 98 that engages the plunger 86. The plunger 96 has its opposite end bored as at 99 to receive a cylindrical extension 101 of a fail safe piston 102. The piston 102 is slidably supported in a bore 103 that experiences the pressure in the conduit 53 via a conduit 104. A coil spring 105 encircles the plunger 96 and bears against a shoulder 106 to act in opposition to the pressure in the bore 103.

The chamber 91 of the fail safe device 84 is in fluid communication with a conduit 107 that extends into a bore 108 of an indicator device, indicated generally by the reference numeral 109. The bore 108 is also in fluid communication with a conduit 111 that extends to the conduit 21 of the brake cylinders 17 and 18.

An indicator plunger, 112 has a larger diameter portion 113 that is slidably supported in the bore 108. The indicator plunger 112 also has a reduced diameter portion 114 that is slidably supported in a smaller diameter bore 115 formed at one end of the bore 108. A necked down portion 116 of the plunger 112 is interposed between the portions 113 and 114.

The head of the portion 114 and bore 115 are exposed to master cylinder pressure by means of a conduit 117 that extends from the conduit 89 to the bore 115. Thus, the opposite ends of the indicator plunger 112 are exposed to the master cylinder pressure and wheel cylinder pressures, respectively. The area of the plunger portion 113 is larger than the area of the plunger portion 114 for a reason which will become apparent as this description proceeds. A coil compression spring 118 may be provided to act on the plunger portion 113 to urge the plunger 112 to a normal braking position as shown in the FIGURE.

An indicator switch, 119 has a plunger portion 121 that is received in the necked down portion 116 and which will be actuated by an inclined ramp 122 formed at the side of the necked down portion 116. The indicator switch 119 is in a circuit with a suitably positioned indicator light (not shown) in the driver's compartment of the associated vehicle. In addition, this circuit is appropriately connected to the control module 26 so that the indicator light will be disabled when the skid control system is in its pressure relief mode. The reason for this will also become apparent as this description proceeds.

The plunger 112 has a small diameter cylindrical extension 123 that is encircled by the spring 118 and which is permitted to engage a shoulder 124 at the end of the bore 108 so that the plunger portion 113 will not interfere with communication between the passages 107 and 111 even when in its extreme left-hand position.

OPERATION

As has been noted, the FIGURE illustrates the system as it appears when in condition for normal brake operation. The power steering pump 49 is generating pressure in the conduit 53 at an amount determined by the position of the regulator 54 which is determined in this condition by the preload on the spring 76. At least the predetermined pressure will be maintained regardless of the demands of the power steering gear 55. This pressure is transmitted through the conduit 59 and normally open valve 58 to the chamber 41 to hold the power piston 42 in a position so as to maintain a minimum volume in the chamber 36 and to hold the check and bleed valve 29 in its open position. Simultaneously, the pump pressure is transmitted through the conduit 104 to act on the fail safe piston 102 and hold the bypass valve 85 in its opened position and the plunger end 87 in its closed position. The indicator plunger 112 is also held in its normal position by the bias of the spring 118.

Upon actuation of the master cylinder 12, pressure will be exerted through the circuit 13 to the front wheel brake cylinders 15 and 16. Pressure will be transmitted through the conduit 14 to the chamber 28. This fluid flows past the open check valve 32, through the passage 33 into the expansion chamber 36. The pressure acting on the power piston 42 holds the expansion chamber plunger 37 in the illustrated position and brake fluid passes from the chamber 36 into the conduit 94. From the conduit 94 brake fluid flows through passage 93 to chamber 91 past the open bypass valve 85. Fluid leaves the chamber 91, passes to conduit 107 through bore 108 and conduit 111 to conduit 21 to actuate the rear wheel cylinders 17 and 18.

During normal actuation of the vehicle brakes, master cylinder pressure will be transmitted from the chamber 28 through conduits 89 and 117 into the bore 115 on the indicator plunger portion 112. The pressure in the wheel cylinders 17 and 18 will be experienced in the bore 108 on the plunger portion 113. As has been noted, the area of the portion 113 is greater than the area of the portion 114 and this area difference coupled with the action of the spring 118 will hold the indicator plunger 112 in its normal position during brake operation.

The master cylinder pressure is also transmitted from the chamber 28 through the conduit 83 on to the smaller plunger 78 of the regulator 54. This will create a bias on the plunger 71 to the left to restrict the flow through the counterbore 74 and raise pressure in the conduit 53 in proportion to the master cylinder pressure exerted on the conduit 14. Hence, further pressure will be exerted on the power piston 42 to resist movement of the expansion chamber plunger 37 and to resist closure of the check and bleed valve 29. Because of this regulation in proportion to master cylinder pressure, it is possible to actuate the system at a lower net pressure. Said another way, if the regulator 54 was not responsive to the pressure in the brake conduit 14, the power piston 42 and pressure in the conduit 53 would have to be set sufficiently to overcome the maximum anticipated pressure in the conduit 14. As a result, it would not be possible to obtain as smoothly a modulated operation.

It should be noted that the ratio of the area of the plunger 71 exposed to the pressure in the chamber 72 to the area of the plunger 78 exposed to the pressure in the chamber 82 is less than the corresponding ratio of the area of the power piston 42 exposed to the pressure in the chamber 41 to the area of the expansion chamber plunger 37 exposed to the pressure in the expansion chamber 36. Thus, as the pressure increases in the brake conduit 14, the regulator 54 will maintain an increased pressure on the power piston 42 and expansion chamber plunger 37 somewhat in excess of that needed to maintain the check and bleed valve 29 in its opened position.

The indicator 119 will provide a visual indication to the vehicle operator in the event that master cylinder pressure from the cylinder 12 is not communicated to the wheel cylinders 17 and 18 due to some malfunction of the modulator 19. Such malfunctions could occur if the power piston 42 becomes seized in the bore 41 in its skid control position or if the expansion chamber plunger 37 becomes seized in the chamber 36 in its skid control position. Either malfunction would cause the check and bleed valve 29 to remain closed at a time when the fail safe device 84 is in its normal, operative position. Closure of the check and bleed valve 29 under this condition would block the master cylinder 12 from communicating with the wheel cylinders 17 and 18. When this happens, the master cylinder pressure will be transmitted through the conduit 89 to the plunger portion 114 and this pressure will not be resisted by a corresponding pressure in the bore 108. The indicator plunger 112 will then shuttle to the left and operate the switch 119 to provide the visual indication.

Similar indications would be provided in the event the passage 59 were to become blocked and cut off the flow of actuating fluid to the power piston 42. At this time, the bleed and check valve 29 would again be permitted to close, even though the fail safe device 84 would be held in its normal braking condition. A substantial leak past the valve seat 67 would cause a similar malfunction. The operator would be warned of this malfunction by closure of the switch 119 in the manner previously described.

In the event an incipient skid condition is sensed by the electric module 26, a signal will be sent via the conductor 27 to the valve 58. The solenoid winding 66 will be energized to draw the valve plate 62 downwardly against the bias of the spring 63. The valve seat 61 will then be closed to isolate the power piston chamber 41 from the pump supply conduit 53. Simultaneously, the pressure in the chamber 41 will be dumped to the sump 51 via the open valve seat 67 and conduit 68. The spring 47 will then urge the power piston 42 to the left. The springs 38 and 39 will, at this time, close the combined check and bleed valve 29 cutting off the communication between the master cylinder conduit 14 and the wheel cylinder conduit 21. The pressure acting in the expansion chamber 36 will, at this time, be sufficient to cause the expansion chamber plunger 37 to move to the left and increase the volume in the expansion chamber 36. This increase in volume relieves the pressure on the wheel cylinders 17 and 18 and, in effect, will release the brakes. It should be noted that at this time the expansion chamber plunger 37 will have moved away from the plungers 33 and 34 of the check and bleed valve 29.

During the relief of brake pressure by the skid control modulator 19, the pressure in the chamber 36 and in all conduits downstream of it will be reduced. Hence, the pressure in the bore 108 will be reduced and the master cylinder pressure acting in the bore 112 will cause the indicator plunger 112 to shuttle to the left. As has been noted, the projection 123 of this plunger will preclude the plunger from blocking communication between the conduits 107 and 111. Since the plunger 112 shuttles to the left, the switch 119 will be actuated. To prevent inadvertent indication to the vehicle operator of brake failure, the switch 119 is in suitable circuit with the control 26 so as to block the indicating signal provided by the switch 119. This may be done by providing a disabling circuit responsive to actuation of the solenoid winding 66.

At a predetermined condition, the electric module 26 will send a signal to cause reapplication of the brakes. In the illustrated embodiment this is done by discontinuing the electric current flow to the solenoid winding 66. The valve plate 62 is then urged upwardly by the spring 63 to close the valve seat 67 and open the valve seat 61. Power steering pump pressure will then be reapplied to the power piston 42 which, in turn, urges the expansion chamber plunger 37 to the right to decrease the volume in the expansion chamber 36. At this time, the combined check and bleed valve 29 will still be closed. Thus, the wheel cylinders 17 and 18 are gradually reapplied first by the action of the expansion chamber plunger 37. It should be noted that, unless the operator has removed his foot from the brake pedal, wheel master cylinder pressure will still be experienced in the conduit 14 and chamber 28.

After the expansion chamber plunger 37 has moved sufficiently it will engage the bleed valve plunger 34 to open it from its engagement with the seat 36. Master cylinder pressure will, then, be similarly reapplied through the small clearance volume. Upon continued movement, the plunger 31 will be engaged to open the check valve 32 and permit free communication between the conduit 14 and the wheel cylinders 17 and 18. As the pressure in the chamber 36 is increased, the pressure in the bore 108 will rise and cause the indicator 112 to shuttle back to its normal braking position.

It will be noted that pressure of the power steering pump 49 is required to hold the check and bleed valve 29 and expansion chamber plunger 37 in their normal braking positions. In the event of failure of the pump 49 or rupturing of any of the conduits 53, 56, 59, 104 or other fluid leakages, there will be insufficient pressure to resist the brake pressure that tends to cause the check and bleed valve 29 and expansion chamber plunger 37 to move to their skid control positions. However, under this circumstance there will be insufficient pressure acting on the fail safe piston 102 to resist the action of the springs 105 and 92. Thus, the plungers 96 and 86 will shuttle to the left. This movement will first cause opening of the communication of the conduit 89 with the chamber 91 through opening of the bypass valve portion 87 and subsequently closing of the isolation valve 85. Thus, a bypass conduit is open to permit brake pressure to be exerted from the master cylinder to the wheel cylinders 17 and 18. The brake pressure flows from the conduit 14 and chamber 28 into the conduit 89. This fluid can then flow through the conduit 95 and conduit 21 to the brake cylinders 17 and 18 to effect actuation. This is accomplished without significant loss of actuating fluid. Some small amount of fluid will be lost, however, due to the movement of the check and bleed valve 29 to its closed position. This amount of fluid is relatively insignificant.

It has already been noted that the indicator device 109 will provide a visual indication to the vehicle operator during unmodulated braking operation if certain types of failures occur so as to prevent communication of the master cylinder 12 with the wheel cylinders 17 and 18. It has also been noted that this indication is disabled during the skid control cycle.

In addition to providing a visual indication of certain types of failure during unmodulated braking operation, the indicator 109 will provide a failure indication under certain instances when the pump 49 is not operative. Normally, under this condition the bypass device 84 should shuttle to the left to provide communication between the master cylinder 12 and the wheel cylinders 17 and 18 independently of the expansion chamber 36. However, in the event the fail safe device 84 does not operate due to seizure of any of its components in their respective portions, pressure in the bore 108 of the indicator 109 will not rise in accordance with pressure in the bore 115. The indicator plunger 113 will then shuttle to the left and actuate the switch 119 to again provide failure indication.

In vehicular operation the skid control modulator 19 may not be called upon to function for long periods of time. That is, an incipient skid condition may not occur for a considerable time period. It is, therefore, desirable to periodically cycle certain of the elements to insure that they will not stick or otherwise bind in their normal positions. The construction of certain elements of the modulator 19 is such that this automatic cycling will occur each time the vehicle engine is started and stopped. As has been noted, the pump 49 is driven by the vehicle engine. Thus, each time the engine stops the pump 49 will not exert pressure in the conduits 53, 59 and 104. Accordingly, the spring 76 will move the regulator plunger 79 to an extreme left-hand position each time the engine stops. In a like manner, the spring 47 will urge the power piston 42 to an extreme left-hand position. The spring 105 will cause a similar action on the plunger 96 and piston 102. The spring 92 will also move the fail safe valve 84 to its closed position and the associated plunger to its opened position. Upon restarting of the vehicle engine, each one of the aforenoted elements will be moved back to the normal braking positions.

The ratio of the area of the fail safe plunger 102 exposed to the pressure in the chamber 103 to the portion exposed to the pressure at the termination of the conduit 94 is less than the corresponding ratio of area of the power piston 42 and expansion chamber plunger 37. Thus, in the event of pressure failure the fail safe device will shuttle before the expansion chamber plunger. The aforementioned ratio of area of the fail safe device is greater than the corresponding area ratio of the regulator 54.

It is to be understood that the foregoing description is that of a preferred embodiment of the invention. In the preferred embodiment, the modulator 19 included the pressure regulator 54. In certain instances, such as where the skid control system is integrated with a hydraulically assisted brake system, the regulator may be eliminated. In such an embodiment, pressure in the conduit 53 would be generated directly by the hydraulic booster of the brake system. Various other changes and modifications may be made without departing from the spirit and scope of the invention as defined by the appended claims.

1. A vehicular skid control system comprising an operator controlled source of actuating fluid, a brake actuating circuit for delivering fluid pressure from said source to at least one wheel brake for selectively actuating said wheel brake, modulator means having a fluid input in communication with the operator controlled source of actuating fluid and a fluid output in communication with the one wheel brake, said modulator means being interposed in said actuating circuit for altering the fluid pressure transmitted from said source to said one wheel brake in response to a predetermined signal for preventing a skid condition, means responsive to the instantaneous pressure differential in said actuating circuit between said fluid input and said fluid output of said modulator means for providing a signal when the pressure differential exceeds a predetermined value, and bypass valve means for providing a path of actuating fluid from said source to the one wheel brake in response to the failure of said modulator means.

2. A vehicular skid control system as set forth in claim 1 further including means for disabling the signal of the last named means upon the actuation of the modulator means to its skid control mode.

3. A vehicular skid control system as set forth in claim 1 wherein the means responsive to the pressure differential is responsive to the pressure downstream of the bypass valve means.

4. A vehicular skid control system as set forth in claim 3 further including means for disabling the signal of the last named means upon the actuation of the modulator means to its skid control mode.

5. A vehicular skid control system as set forth in claim 1 wherein the modulator means comprises a control valve for controlling the flow of actuating fluid from the source to the one wheel brake and an expandable chamber device interposed between the control valve and the one wheel brake and means for moving the control valve to a closed position and for permitting the expandable chamber device to increase in volume to relieve pressure in the one wheel brake in response to the predetermined signal.

6. A vehicular skid control system as set forth in claim 5 further including means for disabling the signal of the means responsive to the pressure differential in response to operation of the modulation means to its skid control position.

7. A vehicular skid control system as set forth in claim 5 wherein the means responsive to the pressure differential is responsive to the pressure downstream of the bypass valve means.

* * * * *